(12) United States Patent
Nagasawa (10) Patent No.: US 9,106,817 B2
(45) Date of Patent: Aug. 11, 2015

(54) IN-VEHICLE CAMERA DEVICE

(71) Applicant: YAZAKI CORPORATION, Minato-ku, Tokyo (JP)

(72) Inventor: Masanori Nagasawa, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 7 days.

(21) Appl. No.: 13/946,026

(22) Filed: Jul. 19, 2013

(65) Prior Publication Data

US 2014/0022449 A1    Jan. 23, 2014

(30) Foreign Application Priority Data

Jul. 20, 2012   (JP) ................... 2012-161228

(51) Int. Cl.
*H04N 5/225*   (2006.01)

(52) U.S. Cl.
CPC .................... *H04N 5/2252* (2013.01)

(58) Field of Classification Search
CPC ... H04N 5/2252; H04N 5/2257; H04N 5/335; G02F 2001/136295
USPC ................... 348/373, 374, 375, 376
See application file for complete search history.

(56) References Cited

U.S. PATENT DOCUMENTS

2007/0195512 A1 * 8/2007 Konno ................ 361/771
2009/0046150 A1 * 2/2009 Hayakawa et al. ........... 348/148

FOREIGN PATENT DOCUMENTS

JP    2006-351210 A    12/2006

* cited by examiner

*Primary Examiner* — Twyler Haskins
*Assistant Examiner* — Padma Haliyur
(74) *Attorney, Agent, or Firm* — Marvin A. Motsenbocker; Mots Law, PLLC (57) ABSTRACT

An in-vehicle camera device includes: a conductive silicone member including a silicone body made from insulating silicone material and a conductive portion which is embedded in the silicone body so as to expose both ends of the conductive portion to opposing surfaces of the silicone body; a circuit substrate having an image pickup device and a substrate terminal which is arranged so as to make contact with the end of the conductive portion on one surface of the silicone body; a terminal holder having a contact face configured to make contact with the other surface of the silicone body; and harness terminals held by the terminal holder. Each harness terminal includes a front end retained on the contact face of the terminal holder. The front end of each harness terminal is positioned in a same plane with the contact face of the terminal holder.

8 Claims, 10 Drawing Sheets

IN-VEHICLE CAMERA DEVICE

BACKGROUND OF THE INVENTION

1. Field of the Invention

The present invention relates to an in-vehicle camera device.

2. Description of the Related Art

Conventionally, there is known an in-vehicle camera device arranged on a bumper, a grille, or the like of a vehicle to take images of an outside view. The in-vehicle camera device includes, in a camera casing, a circuit substrate on which an image pickup device, such as a CCD (charge-coupled device) is mounted. On a front face of the camera casing, there is an optical system, such as lenses, through which outside light is transmitted into the camera casing and then received by the image pickup device to effect an imaging operation of the in-vehicle camera device.

The circuit substrate is formed with input/output (I/O) terminals for inputting/outputting electrical signals. The I/O terminals are connected to connecter terminals penetrating through a part of the camera casing and then electrically connected to an outside equipment through the connector terminals.

In the conventional in-vehicle camera device mentioned above, there is a case of adjusting the positional relationship between an optical axis of the optical system and the image pickup device mounted on the circuit substrate. In detail, the position of the optical axis is adjusted by moving the circuit substrate along a plane perpendicular to the optical axis.

Therefore, as it is impossible to fixedly connect the I/O terminals of the circuit substrate with the connector terminal inside the camera casing, the in-vehicle camera device has been adapted so as to connect the I/O terminals with the connector terminals through the intermediary of wire harness, FFC (flexible flat cable), FPC (flexible printed circuit), or the like.

However, since the so-constructed conventional in-vehicle camera device is required to ensure accommodation space for wire harness, FFC, FPC, or the like, within the camera casing, it is difficult to miniaturize the device as well as the constitution of the device and the assembling operation are relatively complicated.

Figure 1:
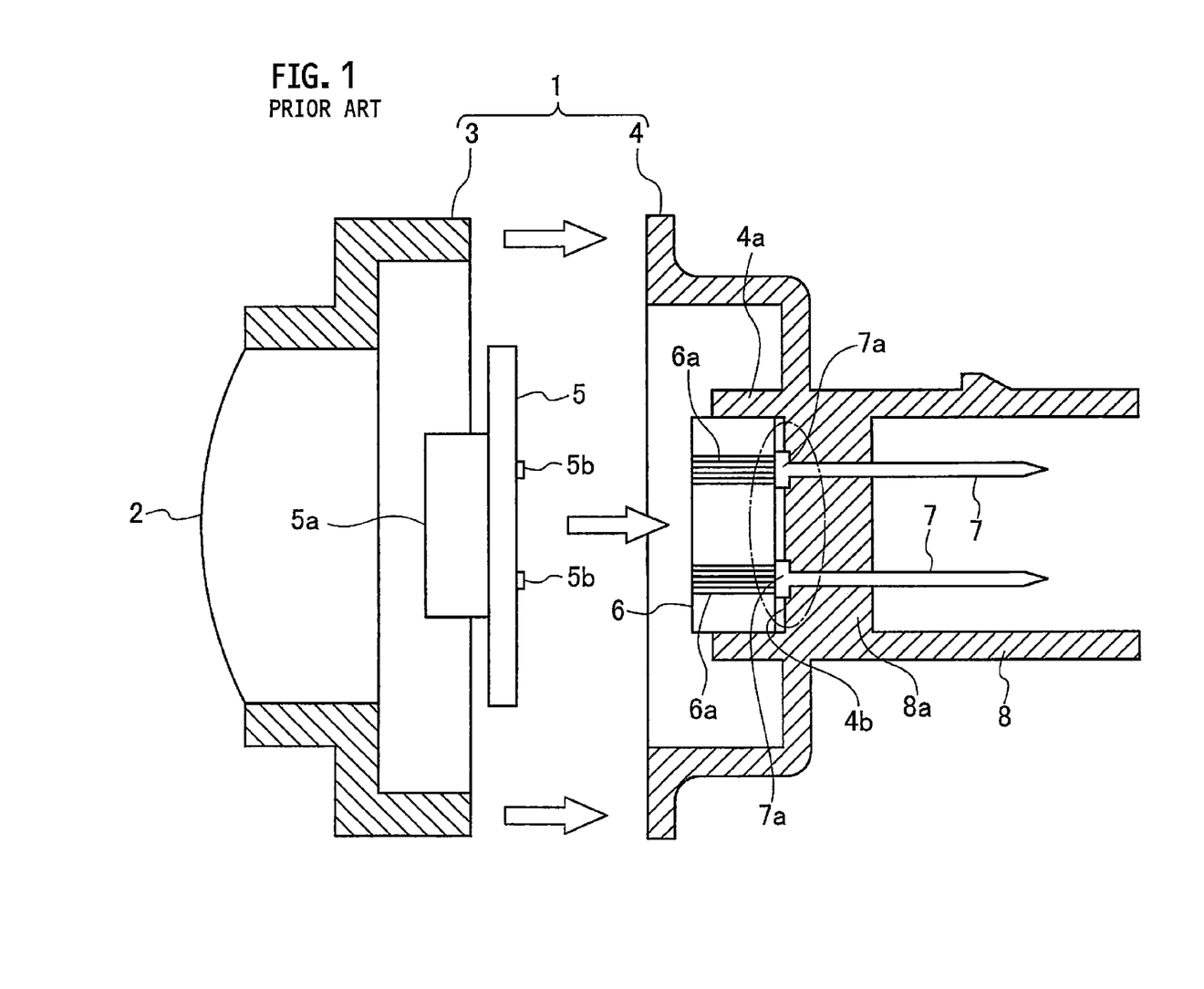
FIG. 1 is a sectional view illustrating a conventional in-vehicle camera device.

In order to solve such problems about the conventional in-vehicle camera device, JP 2006-351210A (Patent Literature 1) proposes an in-vehicle camera device as illustrated in FIG. 1. Thus, as illustrated in FIG. 1, a camera casing 1 of the in-vehicle camera device includes a front casing portion 3 having an optical system 2 and a rear casing portion 4 having a connector housing 8. Accommodated in the front casing portion 3 is a circuit substrate 5 on which an image pickup device 5a is mounted on one surface of the substrate 5 and I/O terminals 5b are mounted on the other surface of the substrate 5.

The rear casing portion 4 is provided inside with an anisotropic conductive sheet 6 having thin metallic wires 6a embedded therein at regular intervals, and connector terminals 7. The anisotropic conductive sheet 6 is retained by a holding portion 4a in the rear casing portion 4. A part of each of the connector terminals 7 is embedded in a housing base portion 8a, while a front end portion 7a of each of the terminals 7 protrudes from a bottom surface 4b of the holding portion 4.

Then, as illustrated with arrows in FIG. 1, when the front casing portion 3 and the rear casing portion 4 are assembled into one body, the I/O terminals 5a of the circuit substrate 5 can be electrically connected to the connector terminals 7 through the thin metallic wirers 6a of the anisotropic conductive sheet 6.

SUMMARY OF THE INVENTION

In the in-vehicle camera device of Patent Literature 1, the I/O terminals 5b of the circuit substrate 5 are electrically connected to the connector terminals 7 through the metallic wirers 6a of the anisotropic conductive sheet 6. Thus, there is no need of ensuring an accommodation space for wire harness, FFC, FPC, or the like within the camera casing 1. Consequently, it is possible to not only miniaturize the in-vehicle camera device but also simplify the constitution of the in-vehicle camera device and also its assembling operation as well.

In the in-vehicle camera device of Patent Literature 1, when the front casing portion 3 and the rear casing portion 4 are assembled into one body, the I/O terminals 5b of the circuit substrate 5 and the front end portions 7a of the connector terminals 7 make contact with respective both ends of the thin metallic wires 6a of the anisotropic conductive sheet 6 under pressure.

Then, the in-vehicle camera device is preliminarily established so that appropriate contact load is applied to the anisotropic conductive sheet 6 through the I/O terminals 5b and the connector terminals 7. This is because, if the contact load on the anisotropic conductive sheet 6 is too small, then the connection between the I/O terminals 5b and the thin metallic wires 6a or the connection between the connector terminals 7 and the thin metallic wires 6a may become incomplete.

On the other hand, if the contact load on the anisotropic conductive sheet 6 is too large, for example, a relative displacement between each connector terminal 7 and the corresponding metallic wire 6a may be produced along with the deformation of the anisotropic conductive sheet 6 and the metallic wires 6a, causing a poor connection.

Under such a situation, it is suspected that the contact load against the anisotropic conductive sheet 6 is reasonable in the in-vehicle camera device of Patent Literature 1. Nevertheless, particularly, when the front end portions 7a of the connector terminals 7 make contact with end portions of the thin metallic wires 6a of the anisotropic conductive sheet 6 under pressure as illustrated with an oval dashed-dotted line of FIG. 1, the anisotropic conductive sheet 6 may be greatly deformed (locally subjected to excessive displacements) in its parts around the thin metallic wires 6a.

Concretely, as the anisotropic conductive sheet 6 is provided with elasticity, there is a possibility that when the front end portions 7a of the connector terminals 7, which are arranged so as to protrude from the bottom face 4b of the holder 4, make contact with the anisotropic conductive sheet 6 under pressure, parts of the anisotropic conductive sheet 6 under pressure contact are greatly depressed to cause local deformations where the vicinities of the parts are greatly risen.

In this way, when the anisotropic conductive sheet 6 is subjected to such local deformations (partial excessive displacements), there is a likelihood that the appropriate contact load preliminarily established for the anisotropic conductive sheet 6 cannot be maintained to make the electrical connection between the connector terminals 7 and the thin metallic wires 6a of the sheet 6 incomplete, causing the reliability of electrical connection to be reduced.

Under such a situation, an object of the present invention is to provide an in-vehicle camera device capable of enhancing the reliability of electrical connection.

An in-vehicle camera device according to a first aspect of the present invention includes: a conductive silicone member including a silicone body made from insulating silicone material and a conductive portion which is embedded in the silicone body so as to expose both ends of the conductive portion to opposing surfaces of the silicone body; a circuit substrate having an image pickup device and a substrate terminal which is arranged so as to make contact with the end of the conductive portion on one surface of the silicone body; a terminal holder having a contact face configured to make contact with the other surface of the silicone body; and harness terminals held by the terminal holder. Each harness terminal includes a front end retained on the contact face of the terminal holder. The front end of each harness terminal is positioned in a same plane with the contact face of the terminal holder.

The terminal holder may be provided with a recess on the contact face and around the front ends of the harness terminals.

In the in-vehicle camera device of the first aspect of the present invention, it is preliminarily established so that a predetermined contact load is applied to the conductive silicone member under condition that the substrate terminal of the circuit substrate and the front ends of the harness terminals make contact with the conductive portion of the silicone member. That is, in the assembled state, the substrate terminal of the circuit substrate and the front ends of the harness terminals make contact with both ends of the conductive portion of the silicone member under pressure. Simultaneously, the contact face of the terminal holder holding the front ends of the harness terminals makes contact with the other surface of the silicone body under pressure.

In operation, when the front ends of the harness terminals makes contact with an end of the conductive portion of the conductive silicone member under pressure, it is about to be greatly deformed around the conductive portion in contact with the front ends of the harness terminals (i.e. local excessive displacement). However, since the front ends of the harness terminals is positioned in the same plane with the contact face of the terminal holder, the deformation of the conductive silicone member is homogenized by the contact face of the terminal holder.

Due to this homogenization in the deformation of the conductive silicone member by the contact face, an appropriate contact load preliminarily established for the conductive silicone member is ensured to maintain a proper electrical connection between the conductive portion of the conductive silicone member and the harness terminal.

In the in-vehicle camera device according to the first aspect of the present invention, as the appropriate contact load preliminarily established for the conductive silicone member is ensured to maintain the electrical connection properly due to the homogenization in the deformation of the conductive silicone member, it is possible to enhance the reliability of electrical connections about the in-vehicle camera device.

DESCRIPTION OF THE EMBODIMENTS

An in-vehicle camera device according to an embodiment will be explained with reference to drawings.

Figure 2:
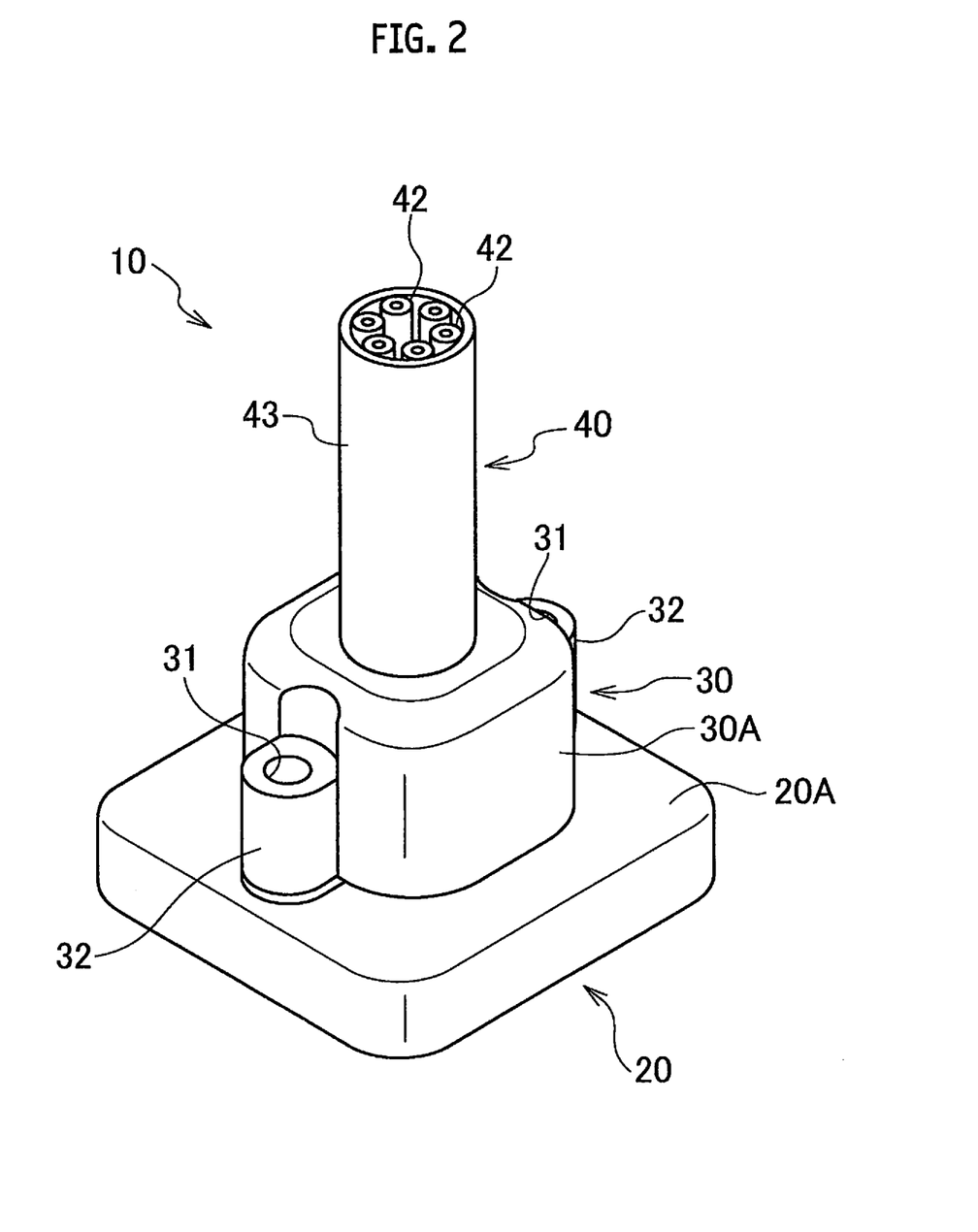
FIG. 2 is a perspective view of an in-vehicle camera device according to an embodiment.
Figure 3:
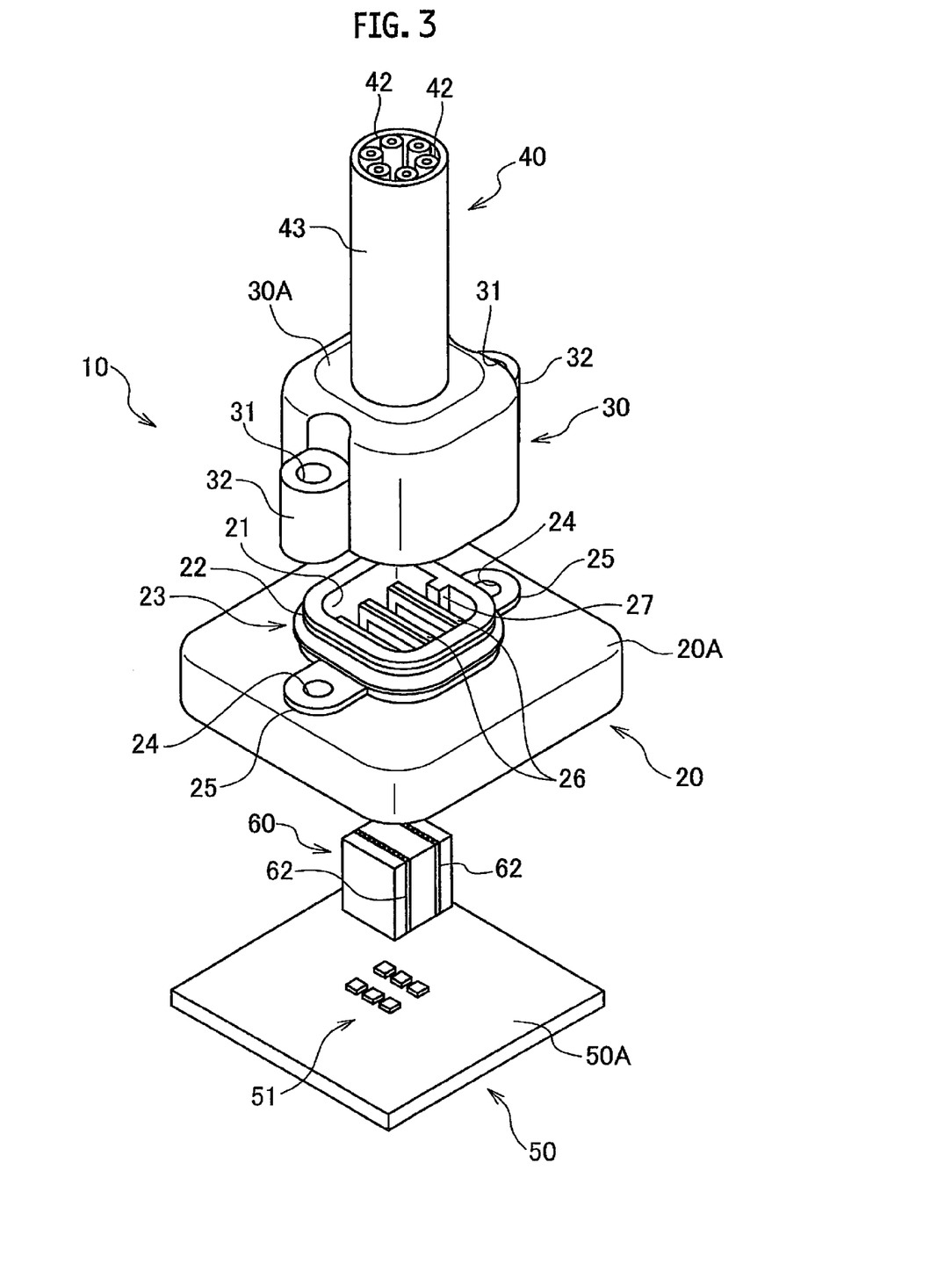
FIG. 3 is an exploded perspective view of the in-vehicle camera device according to the embodiment.

As illustrated in FIGS. 2 and 3, the in-vehicle camera device 10 includes an escutcheon 20, a connector housing 30, and a harness 40.

The escutcheon 20 is connected to the connector hosing 30, and accommodates a circuit substrate 50 and a conductive silicone member 60. A cover (not illustrated) provided with an optical system, such as lenses, is fitted to a front face side of the escutcheon 20 (i.e. a face directing downward of the escutcheon 20 in the FIGS. 2 and 3). The circuit substrate 50 is fitted to an inner side of the cover by screws or the like (not illustrated).

In order to adjust the positional relationship between an optical axis of the optical system of the cover and an image pickup device (not illustrated) on the circuit substrate 50, it is attached to the cover so as to be capable of fine movement along a plane perpendicular to the optical axis. Additionally, since the cover is fitted to the front face side of the escutcheon 20, the circuit substrate 50 fitted to the inner side of the cover is accommodated inside of the escutcheon 20 automatically.

The escutcheon 20 includes an escutcheon body 20A. On a back face side of the escutcheon body 20A (i.e. on a side of the connector housing 30), a recess 21 is formed at a substantial center of the escutcheon 20. Around the recess 21, a connector fitting portion 23 is provided with an engagement step portion 22. On the back face side of the escutcheon body 20A of the escutcheon 20, two connector attachment portions 25 each having a screw hole 24 are positioned opposite to each other while interposing the connector fitting portion 23 therebetween.

In the recess 21, two terminal holders 26 are juxtaposed to each other, in the form of thin plates. The terminal holders 26 mainly serve to accomplish the positioning of harness terminals 36 mentioned later. Further, a positioning protrusion 27 is formed on an inner face of the recess 21. This positioning protrusion 27 serves to position the connector housing 30 in relation to the connector fitting portion 23.

The connector housing 30 includes a connector body 30A. On a side face of the connector body 30A, two column-shaped screw holders 32 each having a screw through-hole 31 are positioned opposite to each other while interposing the connector body 30A therebetween. These screw holders 32 are arranged on the side face of the connector body 30A so that the screw through-holes 31 coincide with the screw holes 24 of the connector attachment portions 25 respectively under condition that the connector housing 30 is fitted to the connector fitting portion 23 of the escutcheon 20.

The harness 40 includes a plurality of wires 42 and an outer insulation 43 for retaining the wires 42.

The circuit substrate 50 includes a substrate body 50A. The substrate body 50A is provided, on a back face side (i.e. on the side of the escutcheon 20), with a plurality of substrate terminals 61 (e.g. six terminals). The substrate terminals 51 are preliminarily designed so as to apply a predetermined contact load on conductive portions 62 of the conductive silicone member 60. In this way, the conduction of the substrate terminals 51 with the conductive portions 62 of the conductive silicone member 60 can be effected since the terminals 51 make contact with the conductive portions 62 under pressure. In the circuit substrate 50, the substrate body 50A is equipped, on a front face side (i.e. on a side opposite to the escutcheon 20), with an image pickup device (not illustrated), such as CCD (charge-coupled device).

Figure 4:
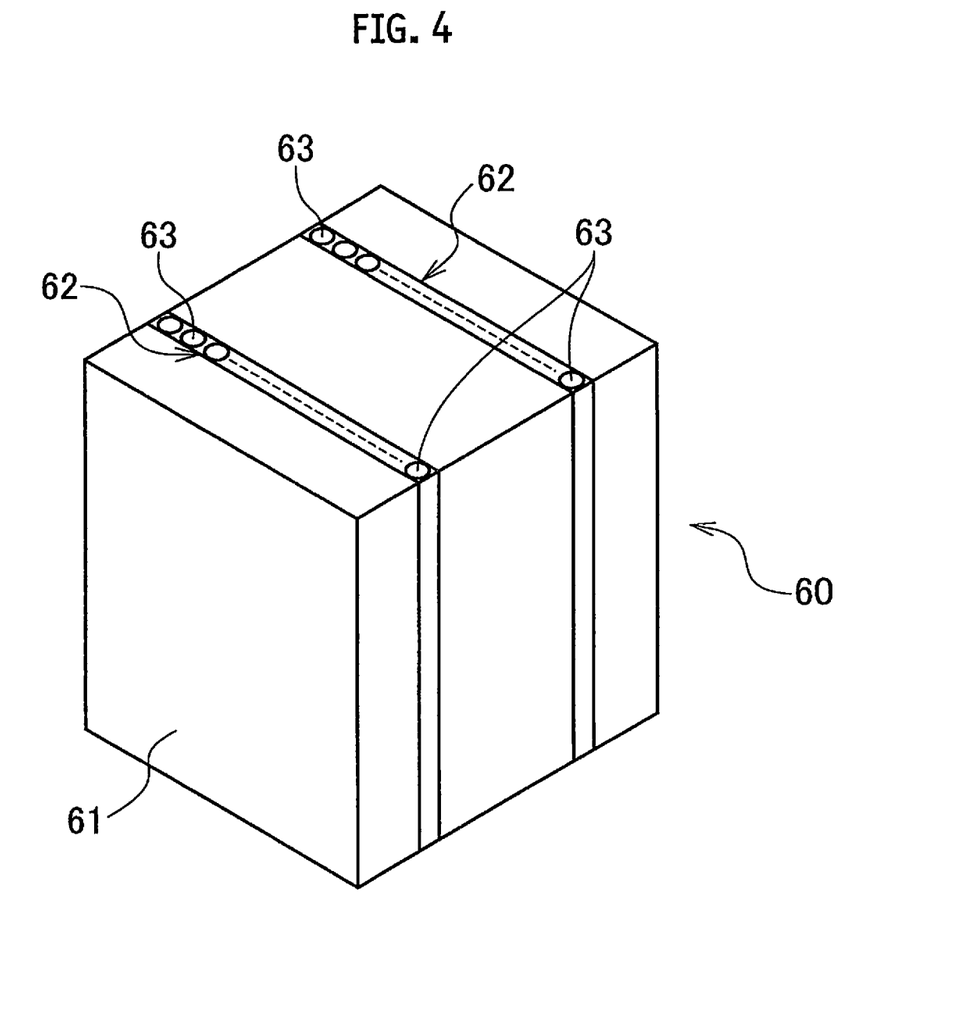
FIG. 4 is a perspective view illustrating a conductive silicone member according to the embodiment.

The arrangement where the conductive silicone member 60 is accommodated in the escutcheon 20 will be described in later. As illustrated in FIG. 4, the conductive silicone member 60 includes a silicone body 61 in the form of a cube. The silicone body 61 is made from insulating silicone material. In the silicone body 61, the conductive portions 62 in two lines are arranged in parallel with one side face of the body 61. The conductive portions 62 are provided since a plurality of core lines 63 are embedded in the silicone body 61. Both ends of each core line 63 are exposed on the silicone body 61, effecting electrical connections of the conductive portions 62 with the substrate terminals 51 of the circuit substrate 50 and also the electrical connection with the harness terminals 36 mentioned later.

Figure 5:
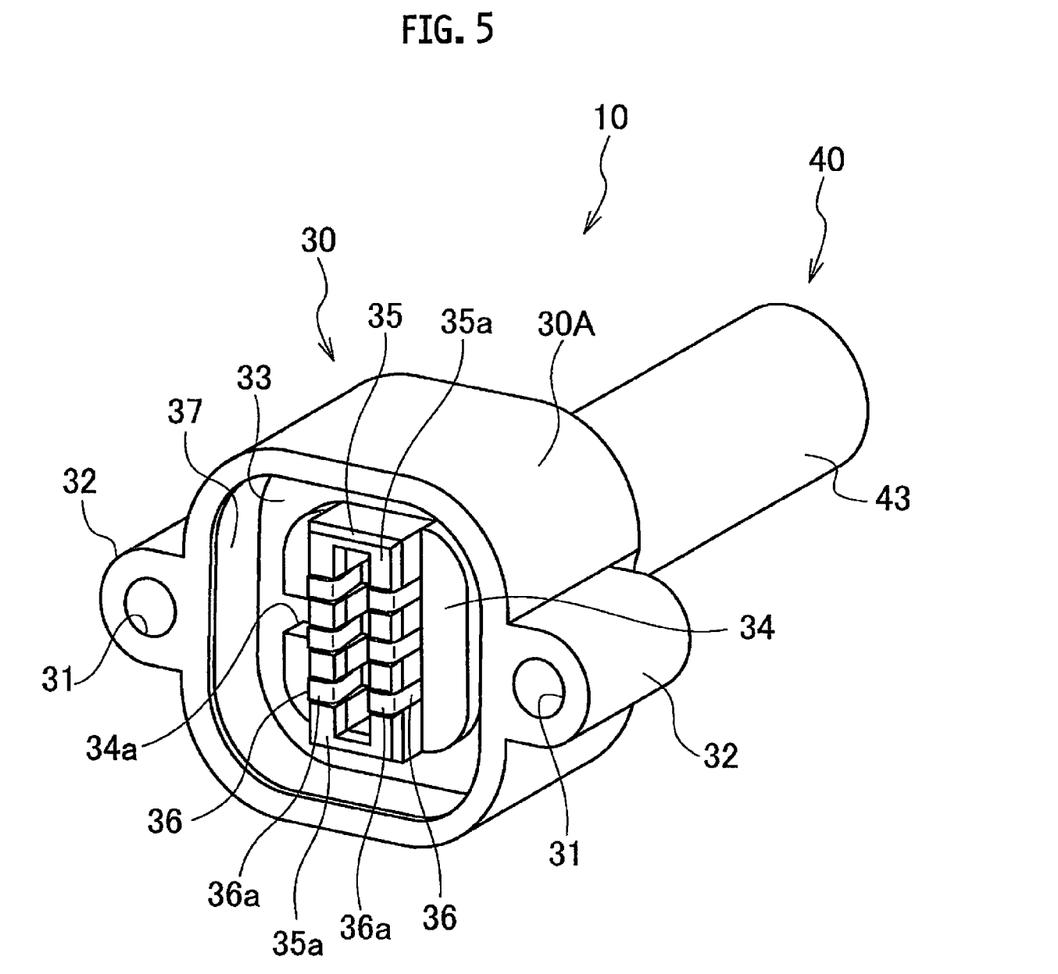
FIG. 5 is a perspective view illustrating a connector housing and harness terminals according to the embodiment.

Inside of the connector body 30A of the connector housing 30, as illustrated in FIG. 5, there are a protrusion portion 34 somewhat protruding from a bottom face 33 and a terminal holder 35 further protruding from the protrusion portion 34. The protrusion portion 34 is provided with an engagement groove 34a for engaging with the positioning protrusion 27 of the escutcheon 20. The harness terminals 36 are fixedly supported by the terminal holder 35.

The terminal holder 35 is provided with a contact face 35a for contacting with a surface of the conductive silicone member 60. The harness terminals 36 are retained so that front ends 36a of the harness terminals 36 are positioned over the contact face 35a. The front ends 36a of the harness terminals 36 are preliminarily designed so as to apply a predetermined contact load on the conductive portions 62 of the conductive silicone member 60. Similarly, the terminal holder 35 is preliminarily designed so as to apply a predetermined contact load on the surface of the conductive silicone member 60 through the contact face 35a in the assembled state.

Consequently, the front ends 36a of these harness terminals 36 and the contact face 35a of the terminal holder 35 make contact with the surface of the conductive silicone member 60 under pressure. Additionally, the front ends 36a of the harness terminals 36 are arranged in a same plane with the contact face 35a of the terminal holder 35. Note, the operation due to the contact face 35a will be described later.

An inner face 37, that is an inner face of a side wall protruding from the bottom face 33, can engage with the engagement step portion 22 of the connector fitting portion 23.

Figure 6:
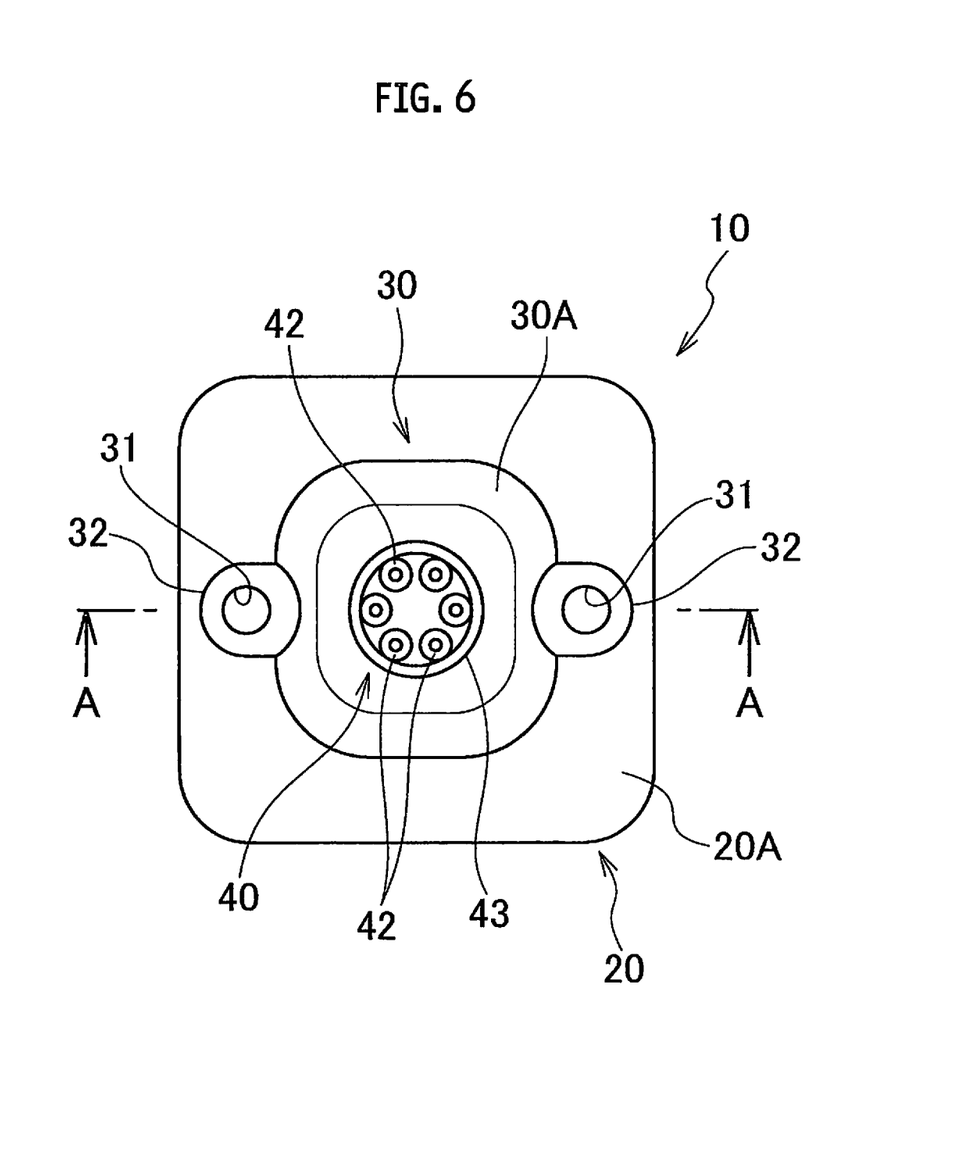
FIG. 6 is a plan view illustrating the in-vehicle camera device according to the embodiment.
Figure 7:
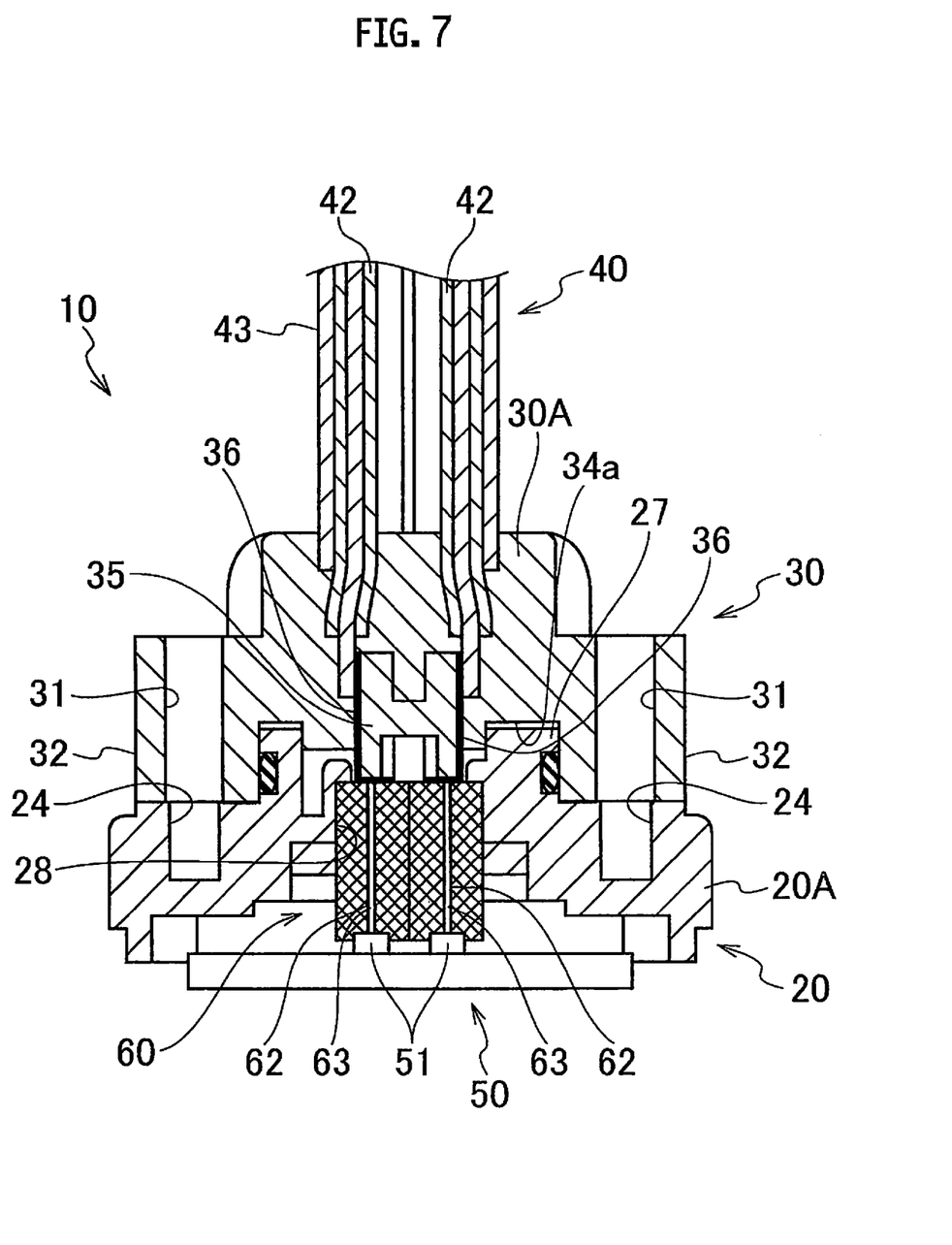
FIG. 7 is a sectional view taken along a line A-A of FIG. 6.

Next, interior structures of the escutcheon 20 and the connector housing 30 will be explained with reference to FIGS. 6 and 7.

An accommodating recess 28 is provided at inside of the escutcheon body 20A of the escutcheon 20. The accommodating recess 28 is formed to accommodate the conductive silicone member 60. In the assembled state, the conductive silicone member 60 is accommodated in the accommodating recess 28 so that respective ends of the core lines 63 of the conductive portion 62 facing upward and downward in the vertical direction of FIG. 7.

A rear end part of the terminal holder 35 having a H-like sectional shape is embedded in a center of inside of the connector body 30A. The harness terminals 36 are fitted to the terminal holder 35 so as to extend from a side face to the front face of the terminal holder 35.

The front end side of the harness 40 is embedded in the rear end side of the connector body 30A of the connector housing 30. Respective tip parts of the wires 42 of the harness 40 are connected to the harness terminals 36, respectively.

The escutcheon 20 is integrated with the connector housing 30 by engaging the inner face 37 of the sidewall of the connector housing 30 with the engagement step portion 22 of the connector fitting portion 23 of the escutcheon 20 and successively screwing screws (not illustrated), which have been inserted into the screw through-holes 31 of the screw holders 32 of the connector housing 30, into the screw holes 24 of the connector attachment portions 25. Further, by accommodating the circuit substrate 50 in the cover (not illustrated) equipped with the optical system (e.g. lenses) and successively fitting the resultant cover to the front side of the escutcheon 20, the cover is integrated with the escutcheon 20.

Figure 8:
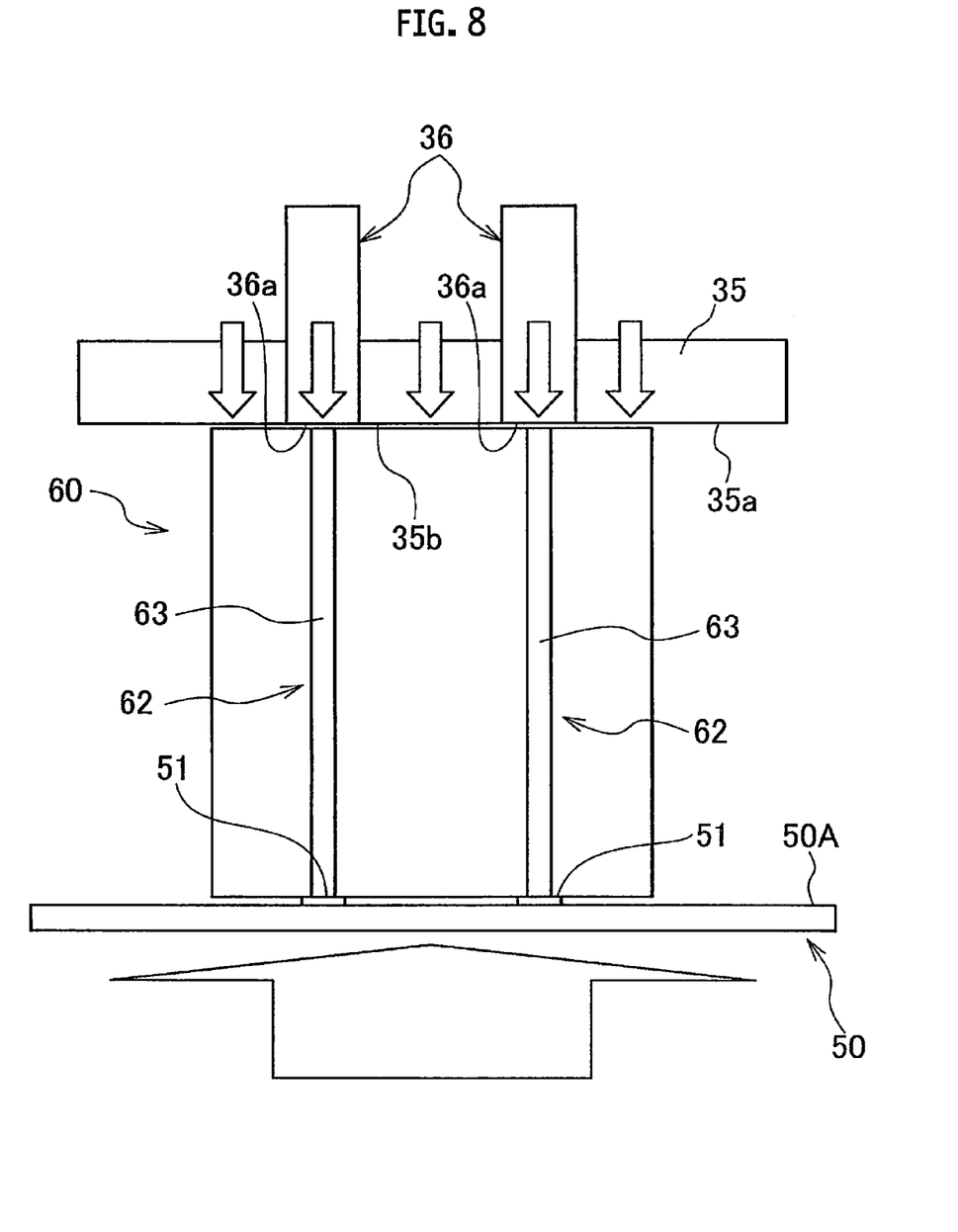
FIG. 8 is an explanatory view illustrating a contact state between the harness terminals and the conductive silicone member.

Thus, when the escutcheon 20, the connector housing 30, and the above cover (not illustrated) are integrated with each other, the vertical contact loads derived from such as the circuit substrate 50 and the harness terminals 30 are applied to the conductive silicone member 60, as illustrated with arrows of FIG. 8. Note, the contact loads are preliminarily established so as to have appropriate values respectively. Accordingly, with the appropriate contact loads, the substrate terminals 51 of the circuit substrate 50 are connected to the harness terminals 36 of the connector housing 30 through the conductive silicone member 60.

Then, the substrate terminals 51 of the circuit substrate 50 make contact with respective one ends of the core wires 63 of the conductive portions 62 of the conductive silicone member 60 under pressure. Meanwhile, the harness terminals 36 of the connector housing 30 make contact with respective other ends of the core wires 63 of the conductive portions 62 of the conductive silicone member 60 under pressure.

More specifically, as the harness terminals 36 are brought into contact with the conductive portions 62 of the conductive silicone member 60 so that the front ends 36a make contact with the other ends of the core wires 63 under pressure, the conductive silicone member 60 is supposed to be greatly deformed (local excessive deformation) around their contacts. Nevertheless, as the front ends 36a of the harness terminals 36 are positioned in the same plane with the contact face 35a of the terminal holder 35, the deformation of the conductive silicone member 60 is homogenized by the contact face 35a making surface contact with the surface of the conductive silicone member 60.

Figure 10:
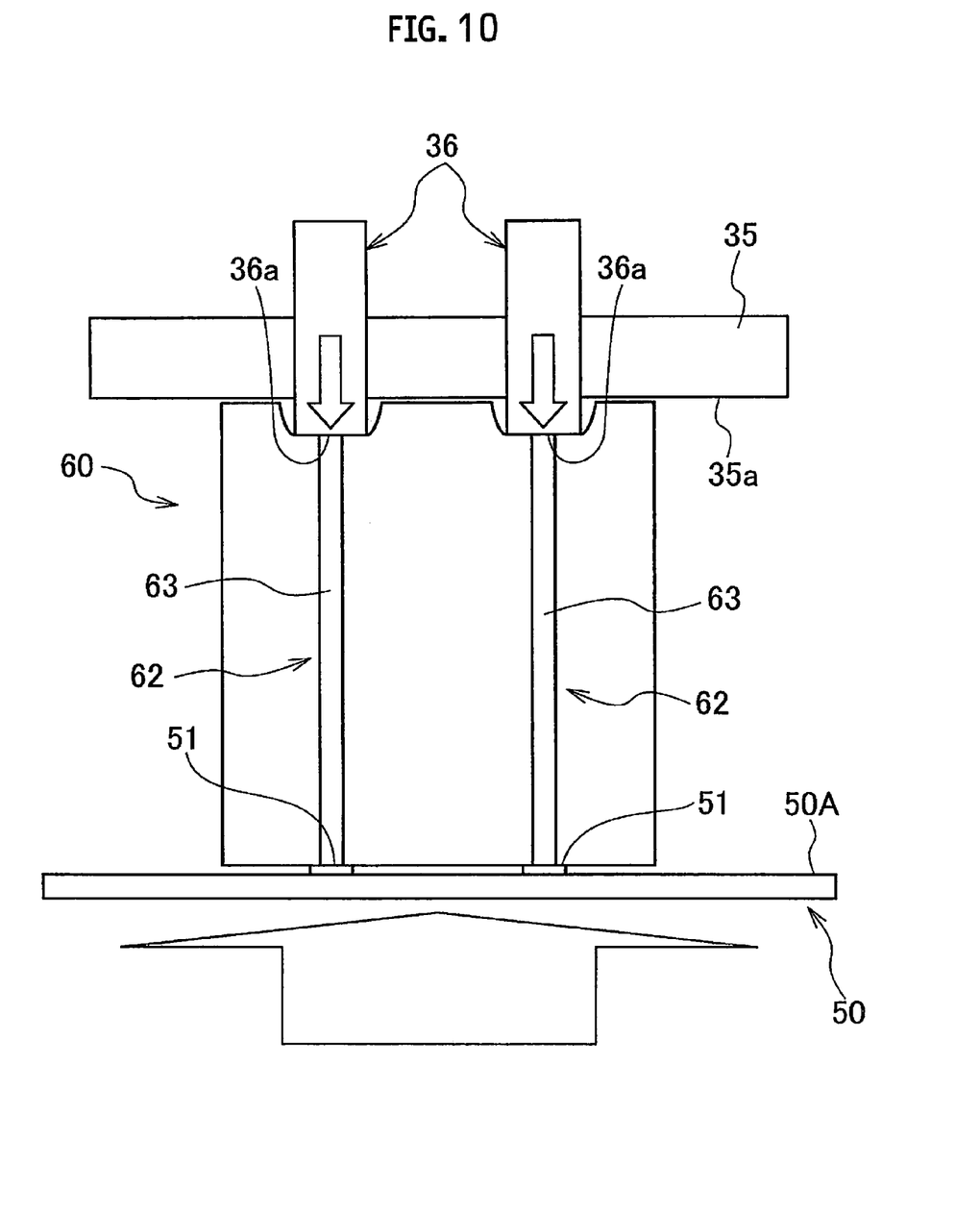
FIG. 10 is an explanatory view illustrating a displacement of the conductive silicone member in contact with the harness terminals.

Suppose, conversely, the front ends 36a of the harness terminals 36 are not in a same plane with the contact face 35a of the terminal holder 35. Then, as illustrated in FIG. 10, the front ends 36a of the harness terminals 36 are brought into contact with the other ends of the core wires 63 of the conductive portions 62 of the conductive silicone member 60, causing its part around the contacts to be greatly deformed (subjected to local excessive deformation).

In this way, if the conductive silicone member 60 is locally and greatly deformed (subjected to local excessive deformation), the appropriate contact load preliminarily established for the conductive silicone member 60 could not be maintained to make the electrical connection between the harness terminals 36 and the core wires 63 of the conductive portions 62 of the conductive silicone member 60 improper, reducing the reliability of electrical connection.

For this reason, according to the embodiment, the front ends 36a of the harness terminals 36 are positioned in the same plane with the contact face 35a of the terminal holder 35. As a result, the deformation of the conductive silicone member 60 is homogenized by the contact face 35a, so that the appropriate contact load preliminarily established for the conductive silicone member 60 can be ensured to maintain the electrical connection properly.

Figure 9:
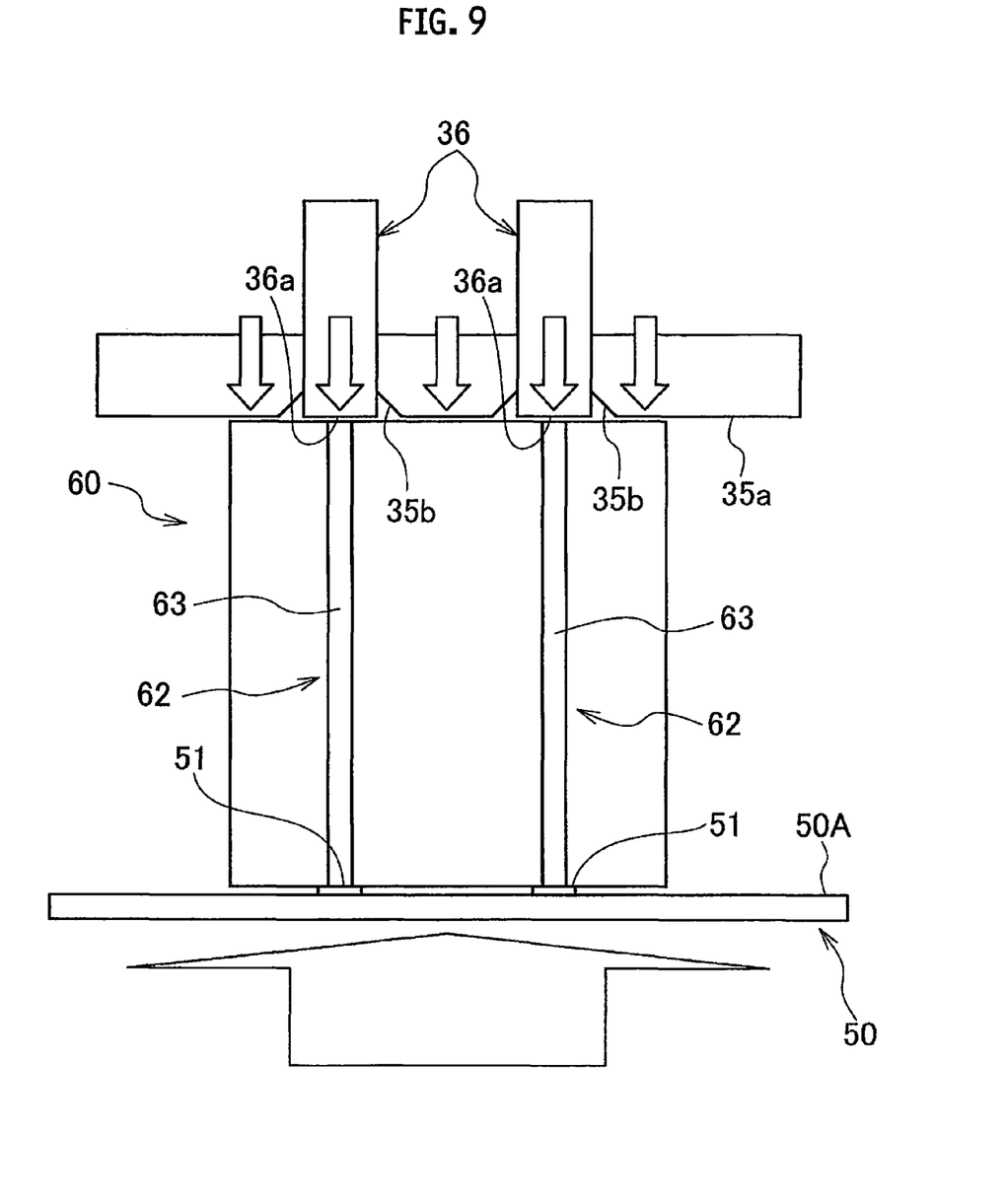
FIG. 9 is an explanatory view illustrating a contact state between the harness terminals and the conductive in a modification of the embodiment.

In a modification of the embodiment as illustrated in FIG. 9, the terminal holder 35 may be provided, around the front ends 36a of the harness terminals 36, with recesses 35b.

In this case, owing to the provision of the recesses 35b, since locally-deformed portions of the conductive silicone member 60 enter into the recesses 35b, it is suppressed that the locally-deformed portions make their way against the front ends 36a of the harness terminals 36, allowing the electrical connection to be maintained properly.

Additionally, even in the modification, as the front ends 36a of the harness terminals 36 are still positioned in the same plane with the contact face 35a of the terminal holder 35, the deformation of the conductive silicone member 60 would be homogenized by the contact face 35a, so that the appropriate contact load preliminarily established for the conductive silicone member 60 could be maintained.

In this way, in the embodiment and the modification, as the front ends 36a of the harness terminals 36 are arranged in the same plane with the contact face 35a of the terminal holder 35, the deformation of the conductive silicone member 60 is homogenized by the contact face 35a despite that the conductive silicone member 60 is about to be greatly deformed around the conductive portions 62 in contact with the front ends 36a of the harness terminals 36 (i.e. local excessive displacement) since the front ends 36 make contact with respective ends of the conductive portions 62 under pressure.

Consequently, the appropriate contact load preliminarily established for the conductive silicone member 60 is ensured to maintain the electrical connection properly, so that the reliability of electrical connection about the member 60 can be enhanced.

Additionally, in the modification, the terminal holder 35 is provided with the recesses 35b formed, around the front ends 36a of the harness terminals 36, on the contact face 35a, then locally-deformed portions of the conductive silicone member 60 in contact with the front ends 36a of the terminals 36 enter into the recesses 35b. Consequently, it can be suppressed that the locally-deformed portions make their way against the front ends 36a of the harness terminals 36, so that the reliability of electrical connection about the member 60 can be enhanced similarly to above.

What is claimed is:

1. An in-vehicle camera device comprising:
    a conductive silicone member including a silicone body made from insulating silicone material and a conductive portion which is embedded in the silicone body so as to expose both ends of the conductive portion to opposing surfaces of the silicone body;
    a circuit substrate including an image pickup device and a substrate terminal which is arranged so as to make contact with the end of the conductive portion on one surface of the silicone body;
    a terminal holder including a contact face configured to make contact with the other surface of the silicone body; and
    a harness terminal held by the terminal holder, the harness terminal including a front end retained on the contact face of the terminal holder, wherein
    the front end of the harness terminal is positioned in a same plane with the contact face of the terminal holder, and
    the conductive portion comprises first and second conductive portions which are embedded in the silicone body so as to expose both ends of the first and second conductive portions to opposing surfaces of the silicone body, the first and second conductive portions respectively provided in first and second lines arranged in parallel with respect to each other in the silicone body.

2. The in-vehicle camera device of claim 1, wherein the terminal holder is provided with a recess on the contact face and around the front end of the harness terminal.

3. The in-vehicle camera device of claim 1, further comprising:
    a protrusion portion protruding from a bottom face of a camera connector body.

4. The in-vehicle camera device of claim 3, wherein the protrusion portion includes an engagement groove for engaging with a positioning protrusion of an escutcheon.

5. The in-vehicle camera device of claim 3, wherein the terminal holder is provided with recesses formed around front ends of the harness terminal and on the contact face.

6. The in-vehicle camera device of claim 1, wherein the conductive silicone member is formed having a rectangular shape.

7. The in-vehicle camera device of claim 4, wherein the conductive silicone member is housed within the escutcheon.

8. The in-vehicle camera device of claim 1, wherein the harness terminal includes a plurality of terminal elements spaced apart from each other by gaps separating adjacent ones of the plurality of terminal elements, and wherein the contact face of the terminal holder includes a plurality of contact elements respectively provided within the gaps.

* * * * *